US009929610B2

(12) United States Patent
Nigo et al.

(10) Patent No.: US 9,929,610 B2
(45) Date of Patent: Mar. 27, 2018

(54) ELECTRIC MOTOR WITH EMBEDDED PERMANENT MAGNET, AND REFRIGERATING AIR CONDITIONING EQUIPMENT EQUIPPED WITH SAME

(71) Applicant: Mitsubishi Electric Corporation, Tokyo (JP)

(72) Inventors: Masahiro Nigo, Tokyo (JP); Naohiro Oketani, Tokyo (JP); Koji Yabe, Tokyo (JP); Kazuhiko Baba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 276 days.

(21) Appl. No.: 14/431,796

(22) PCT Filed: Oct. 29, 2013

(86) PCT No.: PCT/JP2013/079218
§ 371 (c)(1),
(2) Date: Mar. 27, 2015

(87) PCT Pub. No.: WO2014/069438
PCT Pub. Date: May 8, 2014

(65) Prior Publication Data
US 2015/0256038 A1    Sep. 10, 2015

(30) Foreign Application Priority Data
Oct. 30, 2012   (WO) .................. PCT/JP2012/077981

(51) Int. Cl.
*H02K 1/02*      (2006.01)
*H02K 1/27*      (2006.01)
*F25B 31/02*     (2006.01)

(52) U.S. Cl.
CPC ........... *H02K 1/276* (2013.01); *F25B 31/026* (2013.01); *H02K 1/02* (2013.01); *H02K 2213/03* (2013.01)

(58) Field of Classification Search
CPC ...... H02K 1/276; H02K 1/02; H02K 2213/03; F25B 31/026
(Continued)

(56) References Cited

U.S. PATENT DOCUMENTS 5,531,574 A * 7/1996 Honma ............... F04B 39/0005
                                                 417/415
5,548,973 A * 8/1996 Komine ............... C10M 105/36
                                                 252/68
(Continued)

FOREIGN PATENT DOCUMENTS

CN      104704714 A     6/2015
EP      2117102 A1      11/2009
(Continued)

OTHER PUBLICATIONS

JP 2012105410 A Machine Translation.*
(Continued)

*Primary Examiner* — John K Kim
(74) *Attorney, Agent, or Firm* — Posz Law Group, PLC

(57) ABSTRACT

A permanent magnet embedded electric motor includes a slit and a flux barrier. A hole defining portion of a magnet insertion hole includes an extended portion. The extended portion projects toward an interpolar core portion in a rotor core in an area positioned further on an outer side of a circumferential direction with respect to a width-direction end surface of a permanent magnet. (Lb) is larger than (La), and (Lc) is smaller than (Ld), where the (La) represents a distance between the slit and the core outer peripheral surface; the (Lb) represents a distance between the slit and
(Continued)

an outer peripheral-side surface of the permanent magnet; the (Lc) represents a shortest distance between the extended portion and the interpolar core portion; and the (Ld) represents a thickness of the permanent magnet.

12 Claims, 11 Drawing Sheets

(58) Field of Classification Search
USPC ............ 310/156.53, 156.56, 156.57; 62/498
IPC ........................... H02K 1/02,1/27; F25B 31/02
See application file for complete search history.

(56) References Cited

U.S. PATENT DOCUMENTS

| | | | | |
|---|---|---|---|---|
| 5,551,255 | A * | 9/1996 | Rothfleisch | B01D 3/00 62/114 |
| 5,579,651 | A * | 12/1996 | Sugiyama | F04C 23/008 417/902 |
| 5,818,139 | A * | 10/1998 | Yamagiwa | H02K 1/276 310/156.45 |
| 8,106,557 | B2 * | 1/2012 | Yoshino | H02K 1/276 310/156.53 |
| 8,714,948 | B2 * | 5/2014 | Baba | H02K 1/276 310/156.45 |
| 8,772,994 | B2 * | 7/2014 | Feng | H02K 1/276 310/156.53 |
| 9,762,098 | B2 * | 9/2017 | Oketani | H02K 1/28 |
| 2009/0026865 | A1 | 1/2009 | Aota et al. | |
| 2010/0052455 | A1 * | 3/2010 | Feng | H02K 1/276 310/156.08 |
| 2010/0117477 | A1 * | 5/2010 | Yoshino | H02K 1/276 310/156.53 |
| 2010/0119390 | A1 * | 5/2010 | Baba | H02K 1/276 417/423.7 |
| 2010/0156234 | A1 | 6/2010 | Hoemann et al. | |
| 2011/0012460 | A1 * | 1/2011 | Ozeki | H01F 1/0577 310/152 |
| 2012/0112593 | A1 * | 5/2012 | Araki | H02K 1/276 310/156.57 |
| 2012/0242182 | A1 | 9/2012 | Yabe et al. | |
| 2013/0271249 | A1 * | 10/2013 | Suzuki | B22F 3/10 335/302 |
| 2015/0256038 | A1 * | 9/2015 | Nigo | H02K 1/276 62/498 |

FOREIGN PATENT DOCUMENTS

| | | | | |
|---|---|---|---|---|
| GB | 2 520 657 | A | | 5/2015 |
| JP | 11-098731 | A | | 4/1999 |
| JP | 2001-258187 | A | | 9/2001 |
| JP | 2002-238192 | A | | 8/2002 |
| JP | 2011-101595 | A | | 5/2011 |
| JP | 2011-199944 | A | | 10/2011 |
| JP | 2012-055117 | A | | 3/2012 |
| JP | 2012-105410 | A | | 5/2012 |
| JP | 2012105410 | A * | 5/2012 | ............ H02K 1/276 |
| JP | 2012-210040 | A | | 10/2012 |
| WO | 1996/003793 | A1 | | 2/1996 |
| WO | 2007/072707 | A1 | | 6/2007 |
| WO | 2012/026032 | A1 | | 3/2012 |

OTHER PUBLICATIONS

International Search Report of the International Searching Authority dated Jan. 7, 2014 for the corresponding international application No. PCT/JP2013/079218 (and English translation).
Extended European Search Report dated May 24, 2016 in the corresponding EP application No. 13850290.1.
Office Action dated Mar. 2, 2017 issued in corresponding EP patent application No. 13 850 290.1.
Office Action dated Jun. 2, 2017 issued in corresponding CN patent application No. 201380057008.5 (and English translation).

* cited by examiner

ELECTRIC MOTOR WITH EMBEDDED PERMANENT MAGNET, AND REFRIGERATING AIR CONDITIONING EQUIPMENT EQUIPPED WITH SAME

CROSS REFERENCE TO RELATED APPLICATIONS

This application is a U.S. national stage application of International Patent Application No. PCT/JP2013/079218 filed on Oct. 29, 2013, and is based on International Patent Application No. PCT/JP2012/077981 filed on Oct. 30, 2012, the contents of which are incorporated herein by reference.

TECHNICAL FIELD

The present invention relates to a permanent magnet embedded electric motor and a refrigerating air-conditioning apparatus including the permanent magnet embedded electric motor.

BACKGROUND ART

An electric motor to be mounted on a compressor of a refrigerating air-conditioning apparatus is required to satisfy energy saving and low noise and to ensure the use in a high-temperature atmosphere at about 150° C. In general, a Nd—Fe—B based rare-earth magnet has a high residual flux density and hence is suitable for miniaturization and an increase inefficiency of the electric motor. However, as temperature increases, the magnetic coercive force of the Nd—Fe—B based rare-earth magnet decreases. Therefore, there is a problem in that, in the comparison at the same current, electric motors used in a higher temperature atmosphere are more liable to be demagnetized. Therefore, heavy rare-earth elements such as dysprosium (Dy) and terbium (Tb) are added to a rare-earth magnet to be used in a high-temperature atmosphere so as to increase the magnetic coercive force of the rare-earth magnet, thereby preventing the rare-earth magnet from being demagnetized. However, in recent years, the rarity value of the heavy rare-earth elements has increased, and hence the risks of the difficulty in procurement and the rise in prices are increasing. Reflecting such a situation, there is a demand for an electric motor satisfying high efficiency and low noise, in which even a rare-earth magnet having a low magnetic coercive force is less liable to be demagnetized.

In this respect, in Patent Literature 1, there is disclosed a rotor of a permanent magnet electric motor in which a hole for preventing a flux short circuit is formed in a rotor core so as to be brought close to an outer periphery of the rotor core, and the hole for preventing a flux short circuit is formed so as to be brought into contact with a hole for embedding a permanent magnet and an end portion of a permanent magnet to be embedded in the permanent magnet embedding hole. In this rotor, it is expected that the flux short circuit preventing hole prevents a short circuit of a flux in the end portion of the permanent magnet, and the flux in the end portion of the permanent magnet extends to a stator so as to effectively serve to generate a torque, and thus a permanent magnet electric motor having high efficiency and a low cogging torque and having less vibration and noise is obtained.

Further, in Patent Literature 2, there is disclosed a rotor of a permanent magnet electric motor, which has a plurality of slits arranged at a distance along a permanent magnetic insertion hole, and an outer thin portion formed between an outer end of a radial direction of the slits and an outer periphery of a rotor core, the width in the radial direction of the outer thin portion being gradually enlarged from a magnetic pole center to an interpolar portion. In this rotor, it can be expected that a harmonic wave component of a flux density waveform be decreased so as to reduce a harmonic wave of an inductive voltage and a cogging torque.

CITATION LIST

Patent Literature

[PTL 1] JP 11-098731 A
[PTL 2] JP 2011-101595 A

SUMMARY OF INVENTION

Technical Problem

Incidentally, in the permanent magnet electric motor, when a load is large, when the permanent magnetic electric motor is locked during operation due to an excessive load, when the permanent magnet electric motor is in a transition state such as a start-up state, or when a stator winding is short-circuited, a large armature reaction may occur to apply an opposing magnetic field to a rotor. In particular, in the case of a concentrated winding system, adjacent teeth become heteropolar instantaneously to increase an inductance, and thus an opposing magnetic field is liable to be applied to the rotor. In a rotor having a permanent magnet embedded therein, in particular, in a rotor including a flux barrier (a hole for preventing a flux short circuit) in an end portion of a magnet insertion hole and a rotor including a slit in a core portion of a magnetic pole on a rotor surface side as in related-art rotors, there is a problem in that a demagnetization flux bypasses the flux barrier and the slit having a large magnetic resistance so as to be interlinked with a rotor surface portion of a magnet adjacent to the slit or to be interlinked with an end portion of a magnet in the vicinity of the flux barrier close to an interpolar portion, and thus those areas are liable to be demagnetized.

Further, in the case where a protrusion for fixing a magnet is formed on a magnet inner diameter side of a magnet insertion hole in order to position a permanent magnet in the magnet insertion hole, there is the following problem. A distance between a surface of the magnet on an outer diameter side and the protrusion becomes shorter than the thickness of the magnet. Therefore, the demagnetization flux, which has bypassed the flux barrier having a large magnetic resistance, intensively flows to the protrusion having a small magnetic resistance, and thus the end portion of the magnet adjacent to the protrusion is liable to be demagnetized.

The present invention has been made in view of the foregoing, and it is an object of the present invention to provide a permanent magnet embedded electric motor capable of suppressing the demagnetization of a magnet in spite of including a flux barrier and a slit.

Solution to Problem

In order to attain the above-mentioned object, a permanent magnet embedded electric motor according to one embodiment of the present invention includes: a stator; and a rotor arranged rotatably so as to face the stator, in which: the rotor has a plurality of magnet insertion holes formed in a rotor core thereof; flux barriers are formed on both sides of the magnet insertion hole in a circumferential direction; a corresponding permanent magnet is inserted in each of the plurality of magnet insertion holes; a plurality of slits are formed between each of the magnet insertion holes in the rotor core and a core outer peripheral surface of the rotor core; the plurality of slits are arranged in a circumferential direction of the rotor core; each of the plurality of slits extends further in a magnet thickness direction than in a magnet width direction; a hole defining portion of each of the magnet insertion holes includes a pair of extended portions; the extended portion projects toward an interpolar core portion in the rotor core in an area positioned further on an outer side of a circumferential direction with respect to a width-direction end surface of the corresponding permanent magnet; and Lb is larger than La, and Lc is smaller than Ld, where La represents a distance between the plurality of slits and the core outer peripheral surface; Lb represents a distance between the plurality of slits and an outer peripheral-side surface of the permanent magnet; Lc represents a shortest distance between the extended portion and the interpolar core portion; and Ld represents a thickness of the permanent magnet.

Further, Lb/La≥2 and Ld/Lc≥1.2 may be satisfied.

The extended portion may be formed so as to project toward an inner diameter side with respect to a virtual extended line EL in a width direction of the outer peripheral-side surface of the permanent magnet.

The permanent magnet may be a rare-earth magnet containing Dy in a mass content within 2%.

Further, in order to attain the same object, a refrigerating air-conditioning apparatus according to one embodiment of the present invention includes a compressor including the permanent magnet embedded electric motor according to the one embodiment of the present invention as a drive source.

Still further, in order to attain the same object, a refrigerating air-conditioning apparatus according to another embodiment of the present invention includes a compressor including the permanent magnet embedded electric motor according to the one embodiment of the present invention as a drive source, the compressor using R32 as a refrigerant.

Advantageous Effects of Invention

According to one embodiment of the present invention, it is possible to suppress the demagnetization of the magnet in spite of including the flux barrier and the slit.

DESCRIPTION OF EMBODIMENTS

Figure 1:
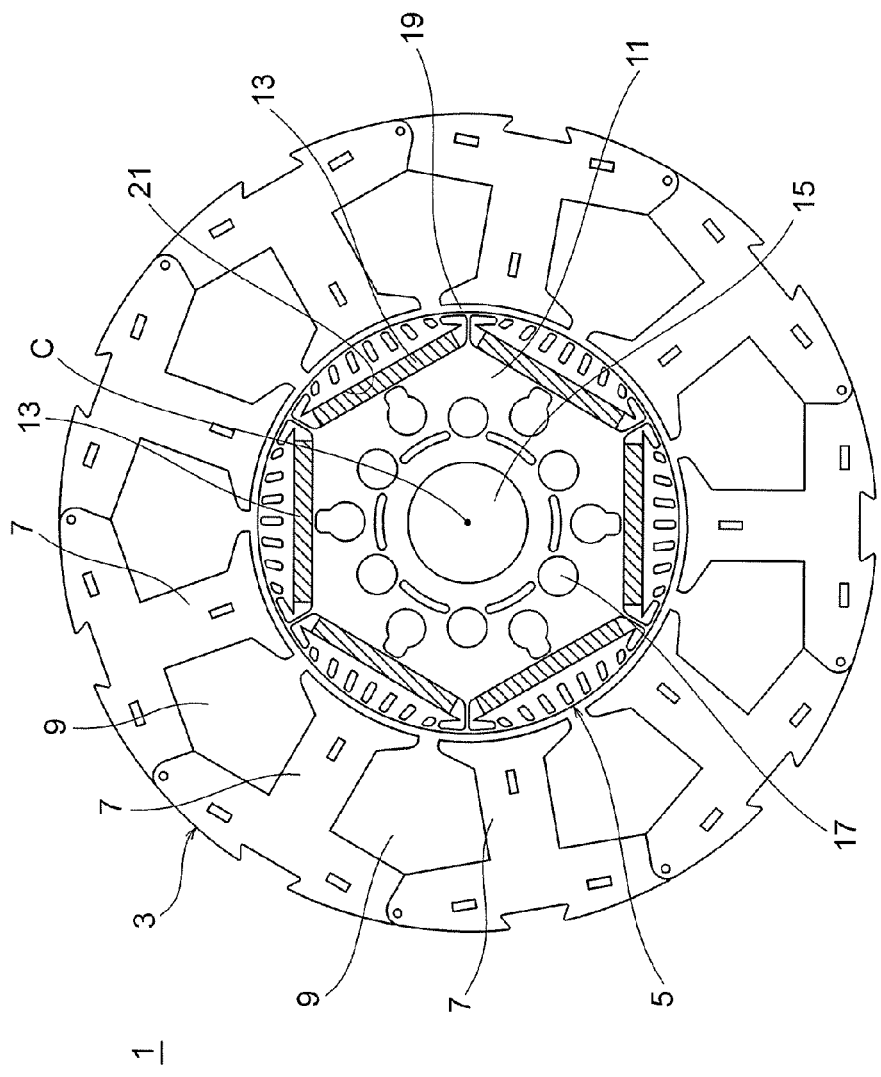
FIG. 1 is a view illustrating a permanent magnet embedded electric motor according to a first embodiment of the present invention.

Now, a permanent magnet embedded electric motor according to embodiments of the present invention is described with reference to the accompanying drawings. Note that, in the drawings, the same reference symbols represent the same or corresponding parts.

First Embodiment

A permanent magnet embedded electric motor according to a first embodiment of the present invention is described. FIG. 1 is a view illustrating a permanent magnet embedded electric motor according to the first embodiment of the present invention.

As illustrated in FIG. 1, a permanent magnet embedded electric motor 1 includes a stator 3 and a rotor 5. The stator 3 includes a plurality of tooth portions 7 arranged equiangularly with an axial center C being the center. A well-known stator winding (not shown) is wound around each tooth portion 7. Further, slot portions 9 are formed between respective pairs of the corresponding tooth portions 7, and the slot portions 9 are also positioned equiangularly.

The rotor 5 includes at least a rotor core 11 and a plurality of permanent magnets 13. A shaft hole 15 is formed in a center portion including the axial center C of the rotor core 11. A well-known shaft (not shown) for transmitting rotation energy to the rotor core 11 is inserted into the shaft hole 15 by shrink fitting or press-fitting.

Further, a plurality of air openings 17 are formed between the shaft hole 15 and a radial region in the rotor core 11 in which the plurality of permanent magnets 13 are arranged.

The rotor 5 is rotatably held on an inner side of the stator 3 in a state in which an air gap 19 is kept between an outer peripheral surface of the rotor 5 and an inner peripheral surface of the stator 3. When a current having a frequency synchronized with an instructed rotation number is applied to the stator 3, a rotation magnetic field is generated in the stator 3 to rotate the rotor 5.

As an example, a stator core in the stator 3 and the rotor core 11 in the rotor 5 are each configured by forming a thin electromagnetic steel plate having a thickness of about 0.35 mm into a predetermined shape and laminating a predetermined number of the steel plates.

The plurality of permanent magnets 13 are accommodated in a plurality of magnet insertion holes 21 formed in the rotor core 11. The plurality of magnet insertion holes 21 are arranged equiangularly with the axial center C being the center, and each of the magnet insertion holes 21 extends toward the axial center C.

In the case where each of the permanent magnets 13 is viewed in a cross section including the axial center C of the rotor core 11 as a normal (that is, in the case where each of the permanent magnets 13 is viewed in FIGS. 1 to 3, etc.), the permanent magnet 13 has a rectangular cross section in which a width direction (described later) is larger than a thickness direction (described later). Further, each of the permanent magnets 13 is formed of, for example, a Nd—Fe—B (neodymium-iron-boron) based plate-like rare-earth magnet having a thickness of about 2.5 mm. In the rotor 5, one permanent magnet 13 is used per pole. Further, the permanent magnets 13 are each magnetized in parallel to the thickness direction (radial direction in FIG. 1), and the plurality of permanent magnets 13 are inserted in the magnet insertion holes 21 so that the polarity alternates. Note that, although the number of magnetic poles of the rotor 5 may be any number as long as two or more poles are arranged, the case where the number of the magnetic poles of the rotor 5 is six is exemplified in the first embodiment. Further, the permanent magnet 13 is not limited to the Nd—Fe—B (neodymium-iron-boron) based rare-earth magnet.

Further, the rotor 5 according to the first embodiment is assumed to be a rotor having a motor structure resistant to demagnetization, and hence the magnetic coercive force of a rare-earth magnet to be used is designed to be low. Because the rare-earth magnet to be used may have low magnetic coercive force characteristics, the amount of heavy rare-earth elements to be added to the rare-earth magnet can be reduced, and the mass content of dysprosium (Dy) is reduced to 2% or less.

Next, the rotor according to the first embodiment is described in detail with reference to FIGS. 2 and 3. FIG. 2 is a view illustrating the rotor from the axial center. FIG. 3 is an enlarged view of a magnetic pole portion of FIG. 2.

Figure 2:
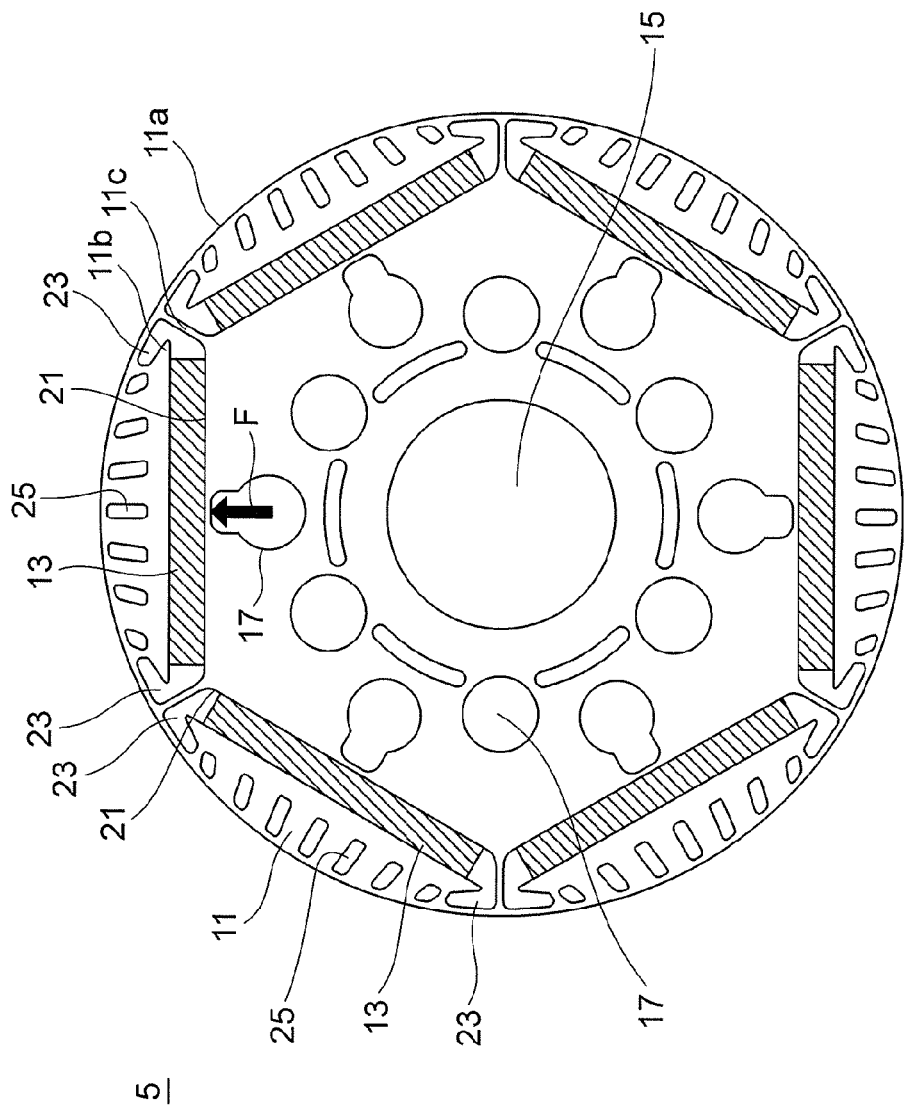
FIG. 2 is a view illustrating a rotor from the axial center.
Figure 3:
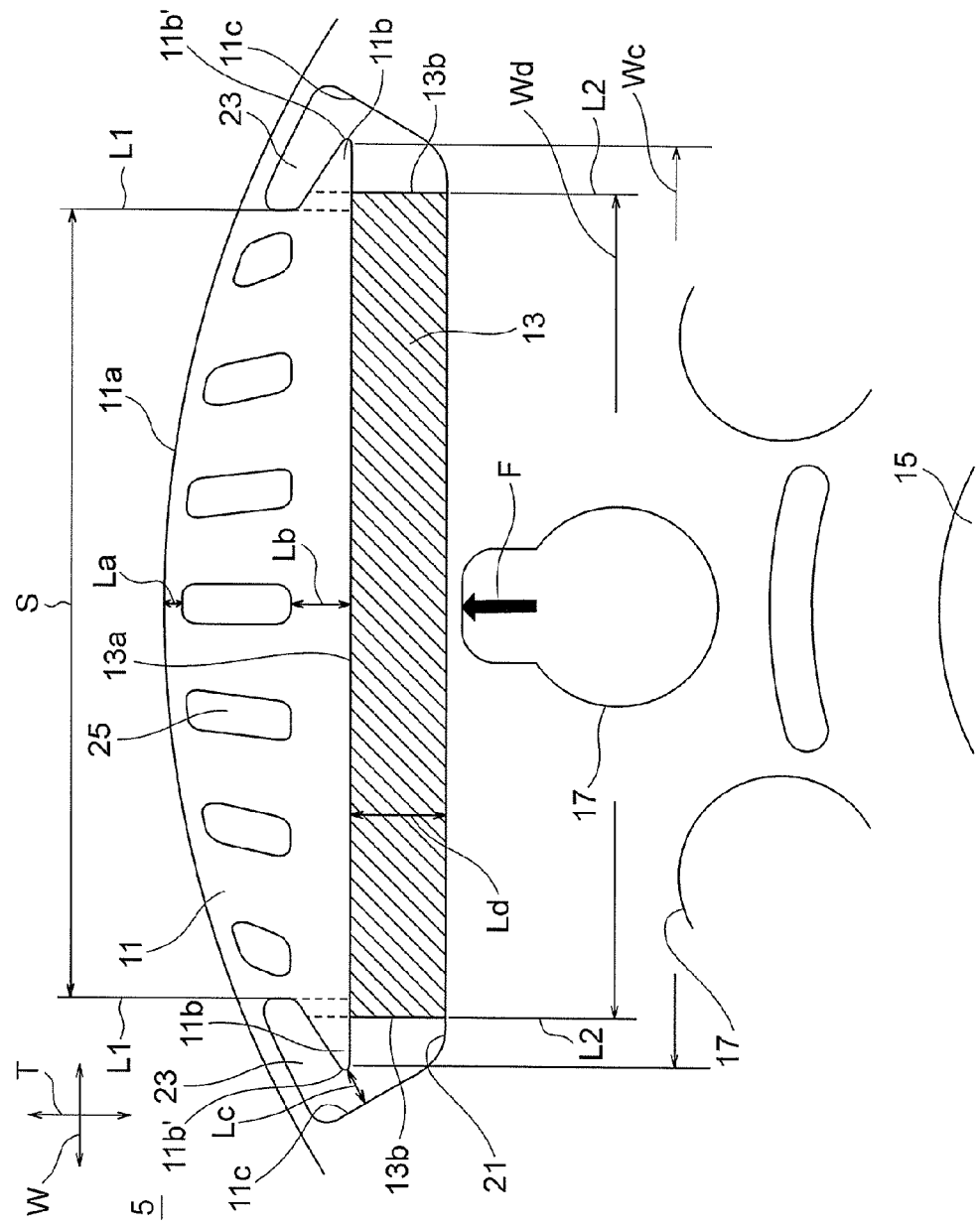
FIG. 3 is an enlarged view of a magnetic pole portion of FIG. 2.

As illustrated in FIGS. 2 and 3, the magnet insertion hole 21 has substantially the same shape as that of the permanent magnet, and flux barriers 23 (holes for preventing a flux short circuit) are formed on both sides of the magnet insertion hole 21 in a circumferential direction.

Further, in the rotor core 11, a plurality of slits 25 are formed between each of the magnet insertion holes 21 and a core outer peripheral surface 11a of the rotor core 11. In the first embodiment, as an example, seven slits 25 are formed on the outer side of the radial direction of each magnet insertion hole 21. The slits 25 are arranged in the circumferential direction of the rotor core 11 between a corresponding pair of the flux barriers 23.

As illustrated in FIG. 3, in the case where the width direction of the permanent magnet 13 is assumed to be a magnet width direction W, and a direction orthogonal to the magnet width direction W is assumed to be a magnet thickness direction T, each of the plurality of slits 25 extends further in the magnet thickness direction T than in the magnet width direction W. Further, the shape and arrangement of the plurality of slits 25 are symmetric (for example, symmetric with respect to a magnetic pole center line) when viewed in the magnet width direction W. The width (dimension in a direction orthogonal to the direction in which the slit 25 extends) of the slit 25 is set to about 1 mm. The slit 25 serves to suppress an armature reaction flux from the stator 3 so as to suppress a surface flux density distribution of the rotor 5. Therefore, it is preferred that the slit 25 be formed in the vicinity of an outer periphery of the rotor.

In this case, a distance between the slit 25 and the core outer peripheral surface 11a is assumed to be La, and a distance between the slit 25 and an outer peripheral-side surface 13a of the permanent magnet 13 is assumed to be Lb. The La is set to be the same with respect to each slit 25 and is set to a thickness of 0.35 mm that is substantially equal to that of the electromagnetic steel plate.

In order to suppress the demagnetization of a surface of the permanent magnet 13 adjacent to the slit 25, the rotor 5 according to the first embodiment is configured so that the distance Lb between the slit 25 and the outer peripheral-side surface of the permanent magnet 13 is set to be larger than the distance La between the slit 25 and the core outer peripheral surface 11a, to thereby set the magnetic resistance of the Lb to be small. In this case, the Lb of each slit 25 is set to be the same, and Lb/La=3 is satisfied. With this, when a demagnetization flux passes through an area denoted by the distance Lb, the demagnetization flux can be prevented from being interlinked with the permanent magnet 13. From the foregoing viewpoint, it is preferred that a relationship: Lb/La≥2 be satisfied, and Lb/La=3 is satisfied in the first embodiment. Note that, it is preferred that the La and the Lb be uniform with respect to all the slits. However, as long as the relationship: Lb/La≥2 is satisfied, the values of the La and the Lb themselves may vary depending on the slit.

A flux is liable to be short-circuited between adjacent permanent magnets 13 on the outer diameter side, and hence a flux path is designed so as to be narrow by forming the flux barrier 23. The distance between the flux barrier 23 and the core outer peripheral surface 11a is set to a thickness of 0.35 mm that is substantially equal to that of the electromagnetic steel plate. Further, an interval S between the flux barriers 23 on both sides of each magnet insertion hole 21 is adjusted to such a width that a flux is likely to be interlinked with the tooth of the stator. In this case, the interval is designed to be slightly smaller than the permanent magnet. The reason for adopting such a rotor configuration is that a short circuit of a flux between the adjacent magnetic poles and a self-short circuit of a flux in an end portion of the permanent magnet are prevented so that a flux in the end portion of the permanent magnet 13 may easily extend to the stator 3, thereby increasing a torque to be generated.

A hole defining portion of the magnet insertion hole 21 is formed of a flat surface in conformity to the shape of the permanent magnet 13 and is configured to be slightly larger than the width of the permanent magnet 13 so as to cover the permanent magnet 13. Further, the hole defining portion on the outer side of the radial direction of the magnet insertion hole 21 includes an extended portion 11b. The extended portion 11b extends so as to include a portion positioned further on an outer side of a circumferential direction with respect to a width-direction end surface 13b of each permanent magnet 13. That is, an interval We in the magnet width direction W between tip ends 11b' of a pair of the extended portions 11b is set to be at least larger than a width Wd in the magnet width direction W of a pair of the width-direction end surfaces 13b in the permanent magnet 13.

The extended portion 11b projects toward an interpolar core portion 11c in the rotor core 11. With this configuration, the demagnetization flux concentrated in the interpole vicinity through the Lb is easily short-circuited to the interpolar core portion 11c through the extended portion 11b, and the demagnetization flux is less liable to be interlinked with the permanent magnet 13.

When a shortest distance between the extended portion 11b and the interpolar core portion 11c is assumed to be Lc and a magnet thickness is assumed to be Ld, the Lc is designed to be smaller than the Ld, and as an example, Ld/Lc=2 is satisfied in the first embodiment. Note that, the present invention is not limited thereto, and it is preferred that a relationship: Ld/Lc≥1.2 be satisfied.

Further, now, a relationship between the plurality of slits 25 extending further in the magnet thickness direction T than in the magnet width direction W and the pair of extended portions 11b is described. The formation position of the plurality of slits 25 in the magnet width direction W is limited within the interval S between the flux barriers 23 of the corresponding pole of the slits 25. In other words, the plurality of slits 25 are formed so as not to be positioned in a region between a virtual line L1 defining the interval S of the flux barriers 23 and the tip end 11b' of the extended portion 11b on the corresponding side with respect to a position in the magnet width direction W. As an example, in particular, in the configuration illustrated in FIG. 3, the plurality of slits 25 are formed so as not to be positioned in a region between a virtual line L2 defining the width Wd of the permanent magnet 13 and the tip end 11b' of the corresponding extended portion 11b with respect to a position in the magnet width direction W.

In the rotor core 11, the plurality of air openings 17 each serving as a refrigerant flow path are formed on an inner side of the radial direction of the plurality of magnet insertion holes 21. The air opening 17 close to the magnet insertion hole 21 serves to suppress the movement of the permanent magnet 13. Specifically, the permanent magnet 13 is inserted into the magnet insertion hole 21 of the rotor 5 so as to be positioned. Then, a tapered bar (not shown) is press-fitted into the air opening 17 close to the magnet insertion hole 21 so as to apply a force denoted by the arrow F in the figure to the magnet insertion hole 21 while deforming the air opening 17, and thus such a pressure as to hold the permanent magnet 13 is applied to the permanent magnet 13. Accordingly, even when an electromagnetic force is applied to the permanent magnet 13 during driving, the permanent magnet 13 does not move.

The permanent magnet embedded electric motor 1 according to the first embodiment is intended to perform a high-efficient operation in accordance with requested product load conditions by conducting variable speed drive with pulse width modulation (PWM) control through use of an inverter of a drive circuit. The permanent magnet embedded electric motor 1 is mounted on, for example, a compressor of an air-conditioning apparatus and ensures the use in a high-temperature atmosphere at 100° C. or more.

Figure 4:
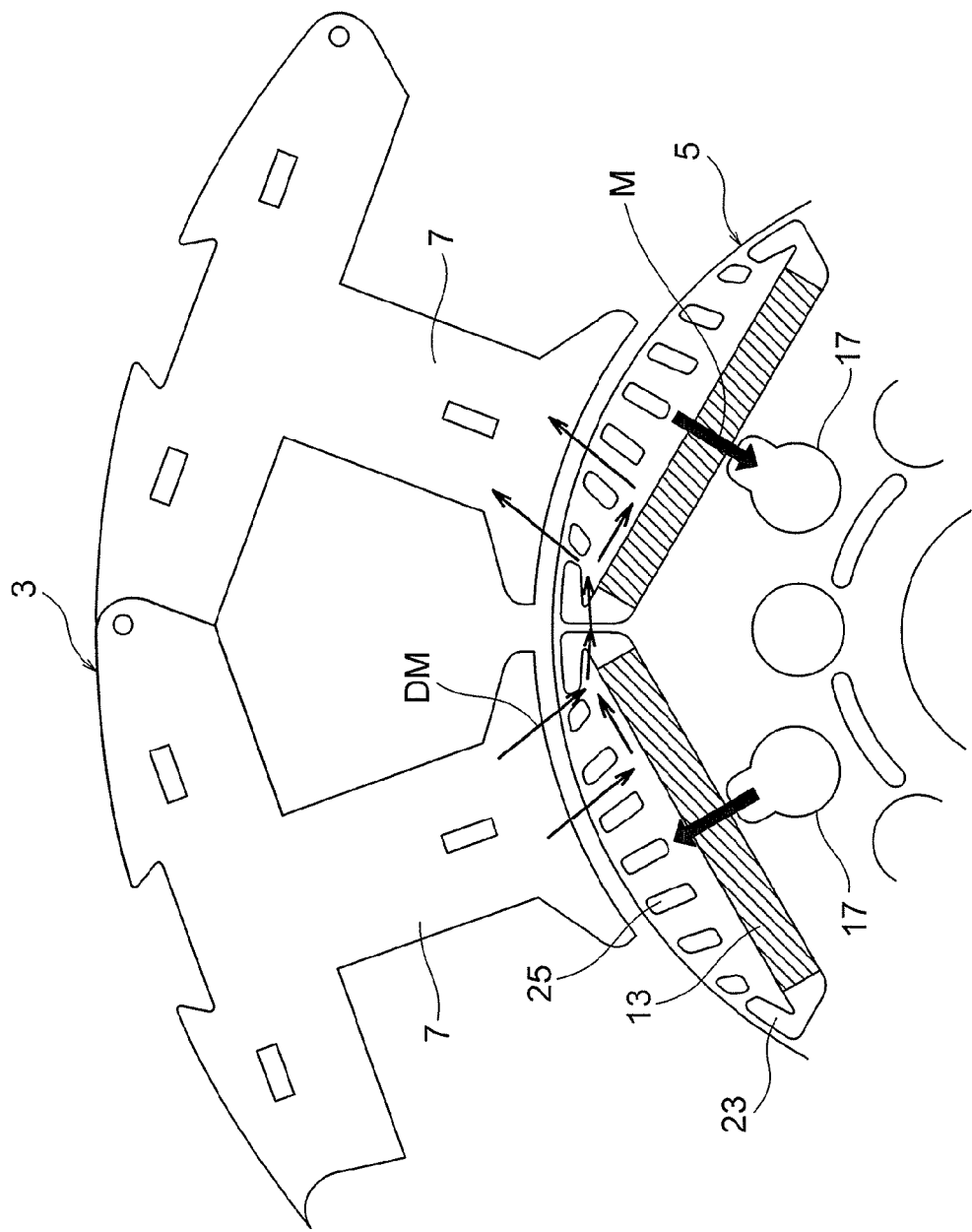
FIG. 4 is a view illustrating how a demagnetization flux flows according to the first embodiment.
Figure 5:
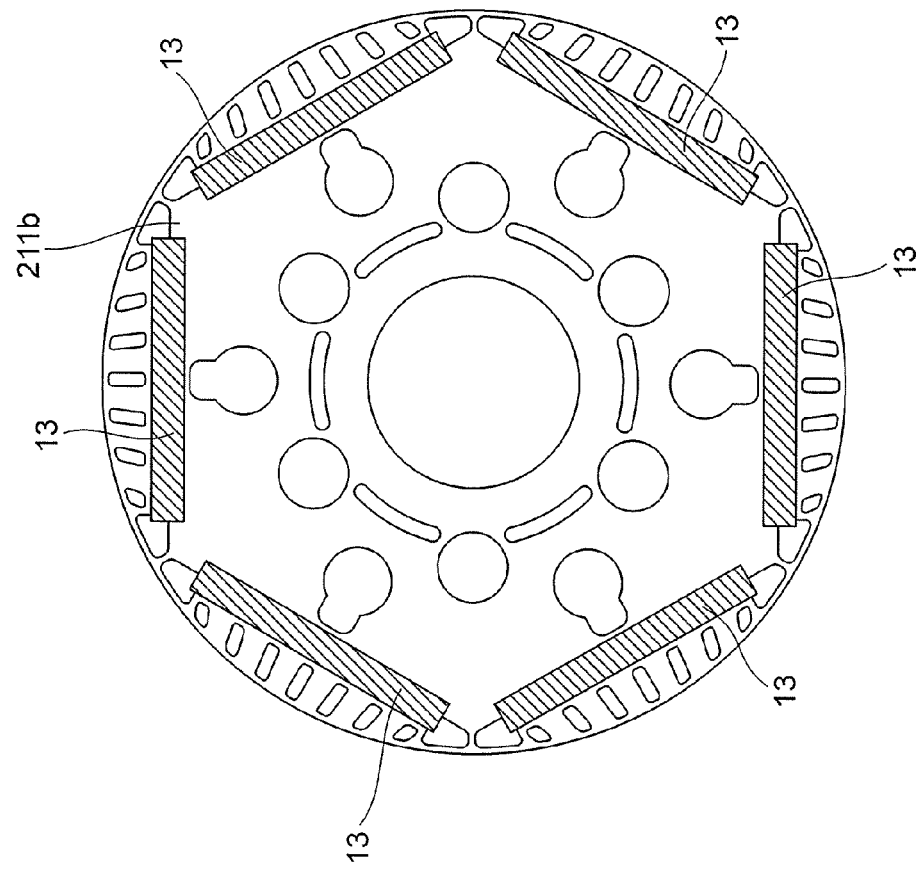
FIG. 5 is a view illustrating a comparative example in the same manner as that of FIG. 2.
Figure 6:
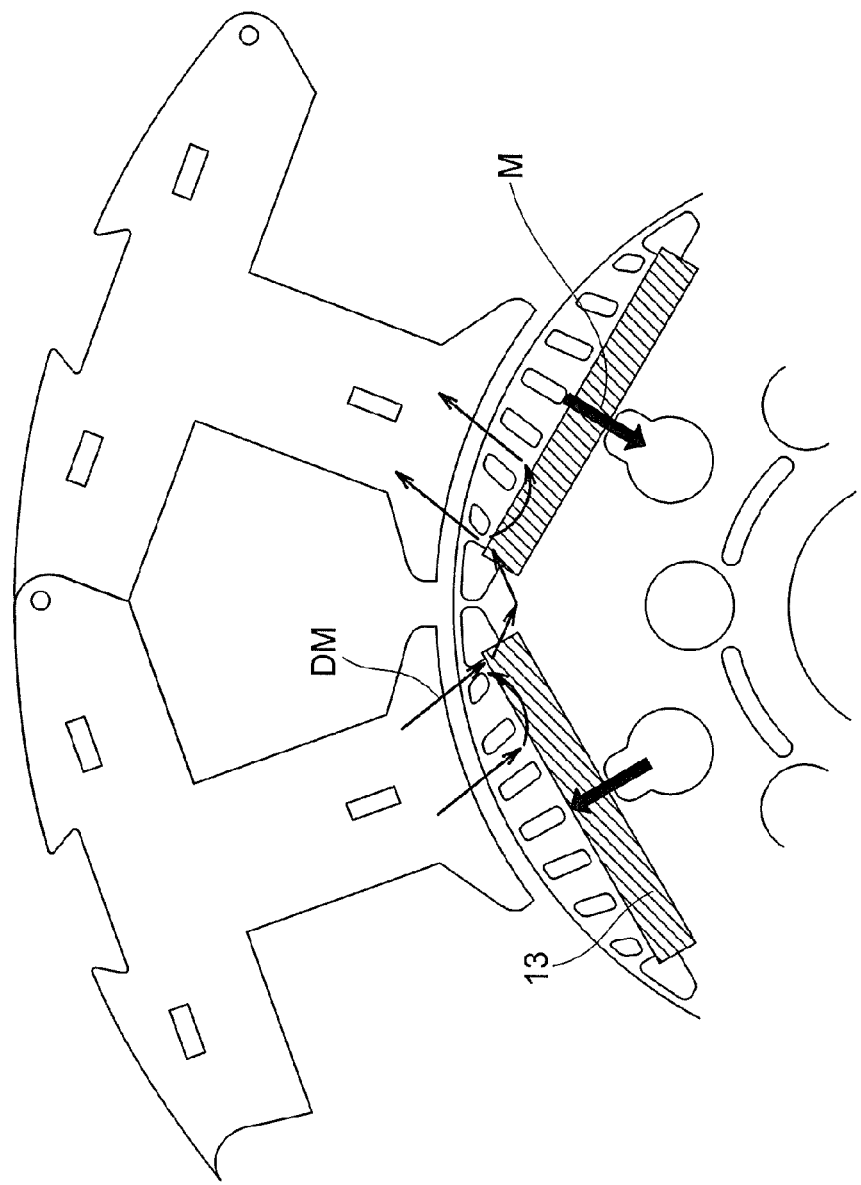
FIG. 6 is a view illustrating the comparative example in the same manner as that of FIG. 4.

Next, the operation of the permanent magnet embedded electric motor according to the first embodiment is described. FIG. 4 is a view illustrating how the demagnetization flux flows according to the first embodiment. Further, FIGS. 5 and 6 are views illustrating a comparative example in the same manner as those of FIGS. 2 and 4, respectively. In the permanent magnet embedded electric motor, for example, 1) when a load is large, 2) when the permanent magnet embedded electric motor is locked during operation due to an excessive load, 3) when the permanent magnet embedded electric motor is in a transition state such as a start-up state, or 4) when a stator winding is short-circuited, a large armature reaction may occur to apply an opposing magnetic field (demagnetization field) to the rotor. In particular, in the case of a concentrated winding system, adjacent teeth become heteropolar to increase an inductance, and thus the opposing magnetic field is liable to be applied to the rotor. The opposing magnetic field refers to a magnetic field of a pole opposite to the direction of the magnetic pole of the rotor, which is generated when a current is applied to the stator. Such an opposing magnetic field has a property of flowing through a portion having a smallest possible magnetic resistance while avoiding a portion having a large magnetic resistance. In particular, in the case where the flux barrier is formed in the end portion of the magnet insertion hole or the slit is formed in the core portion on the rotor surface side of the magnetic pole as in related-art rotors, as illustrated in FIGS. 5 and 6, the demagnetization flux bypasses the flux barrier and the slit having a large magnetic resistance so as to be interlinked with the rotor surface portion of the magnet adjacent to the slit or to be interlinked with the end portion of the magnet in the vicinity of the flux barrier close to the interpolar portion, and thus those areas are liable to be demagnetized. Note that, a symbol "M" in FIGS. 4 and 6 denotes a magnetization direction of the magnet, and a symbol "DM" therein denotes how the demagnetization flux flows.

Further, the permanent magnet holds the original magnetic characteristics when the opposing magnetic field is at a certain threshold value or less. However, when the opposing magnetic field exceeds the threshold value, the residual flux density of the permanent magnet decreases and the permanent magnet undergoes irreversible demagnetization which prevents returning to the original magnetic characteristics. When the irreversible demagnetization occurs, the residual flux density of the permanent magnet decreases, and a current for generating a torque increases, with the result that the controllability as well as the efficiency of the electric motor are degraded to decrease reliability.

In order to solve the foregoing problem, in the first embodiment, the permanent magnet embedded electric motor is designed so as to satisfy the relationship: $Lb/La \geq 2$ as described above. Thus, the flux path in a portion between the slit 25 and the surface on the outer diameter side of the permanent magnet 13 in the rotor core 11 is enlarged, and when the demagnetization flux passes as illustrated in FIG. 4, the flux passes through the portion of the enlarged flux path, with the result that the demagnetization flux is less liable to be interlinked with the permanent magnet 13. Further, the permanent magnet embedded electric motor is designed so as to satisfy the relationship: $Ld/Lc \geq 1.2$, and thus the pathway having a magnetic resistance smaller than that in the magnet thickness direction is formed in an area denoted by the Lc so that the demagnetization flux is guided to flow through the area of the Lc as illustrated in FIGS. 3 and 4. Further, in this case, the Lc is formed in the interpolar direction away from the magnet, and hence the demagnetization flux is less liable to be interlinked with the magnet.

Accordingly, in the first embodiment, the demagnetization resistance is significantly improved for the first time by combining the relationship between the La and the Lb with the relationship between the Lc and the Ld. That is, the demagnetization resistance is significantly improved only with a series of the pathways: the demagnetization flux applied to the rotor 5 is caused to pass between the permanent magnet 13 and the plurality of slits 25 so as not to be interlinked with the permanent magnet 13, and is collected in the extended portion 11b of the rotor core 11 to be released to the interpolar core portion 11c away from the permanent magnet 13 through the area denoted by Lc.

Figure 7:
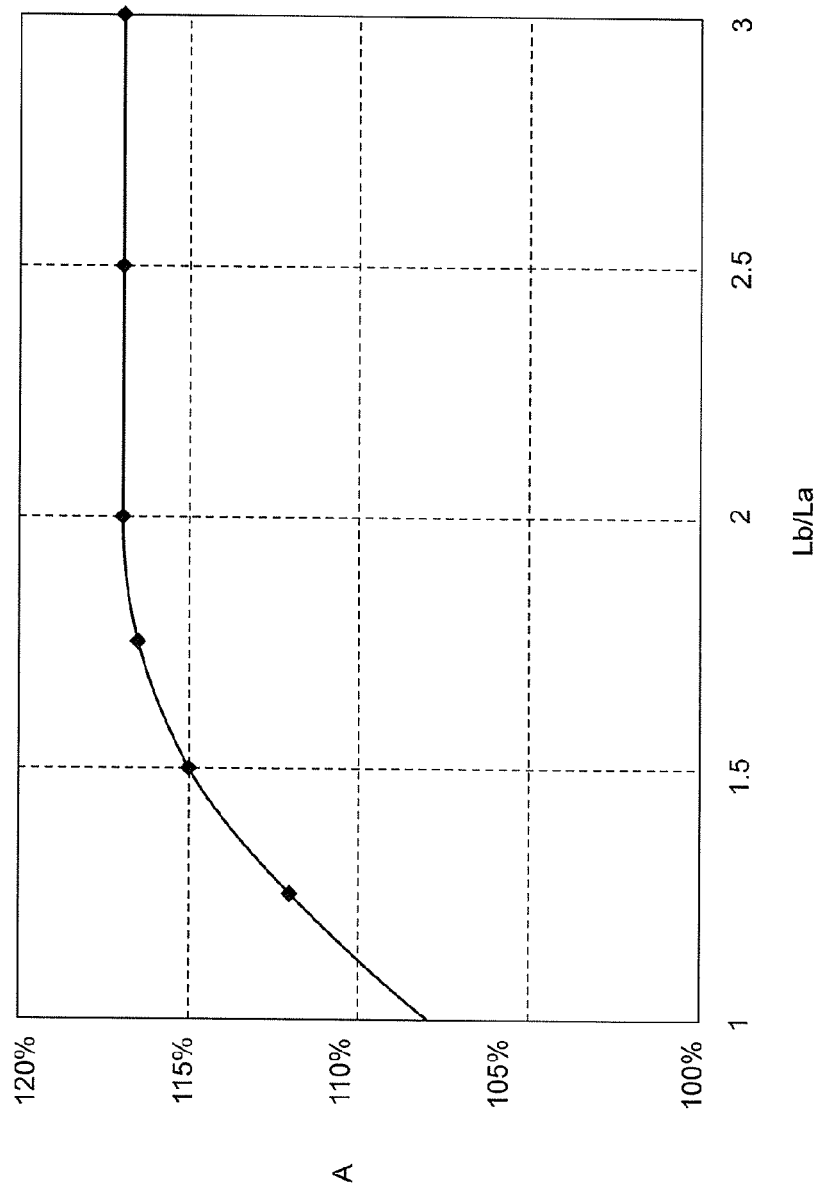
FIG. 7 is a graph showing a relationship between Lb/La and a motor current A.
Figure 8:
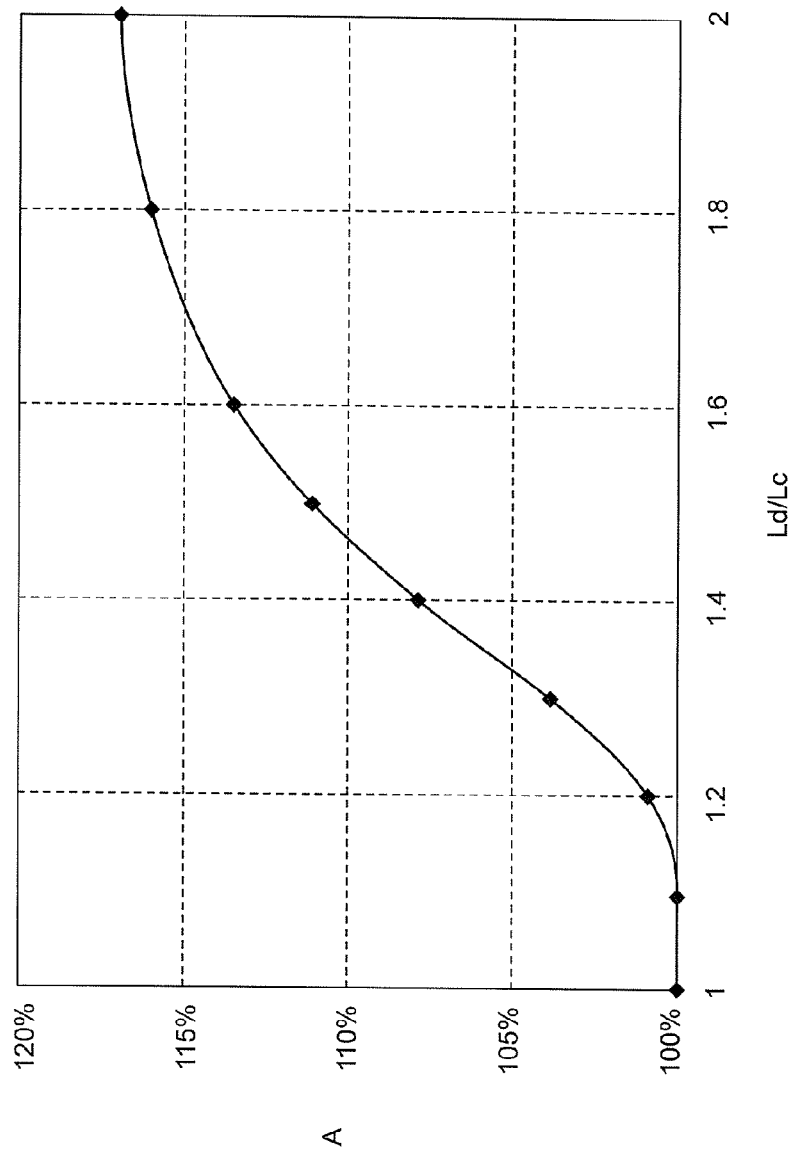
FIG. 8 is a graph showing a relationship between Ld/Lc and the motor current A.
Figure 9:
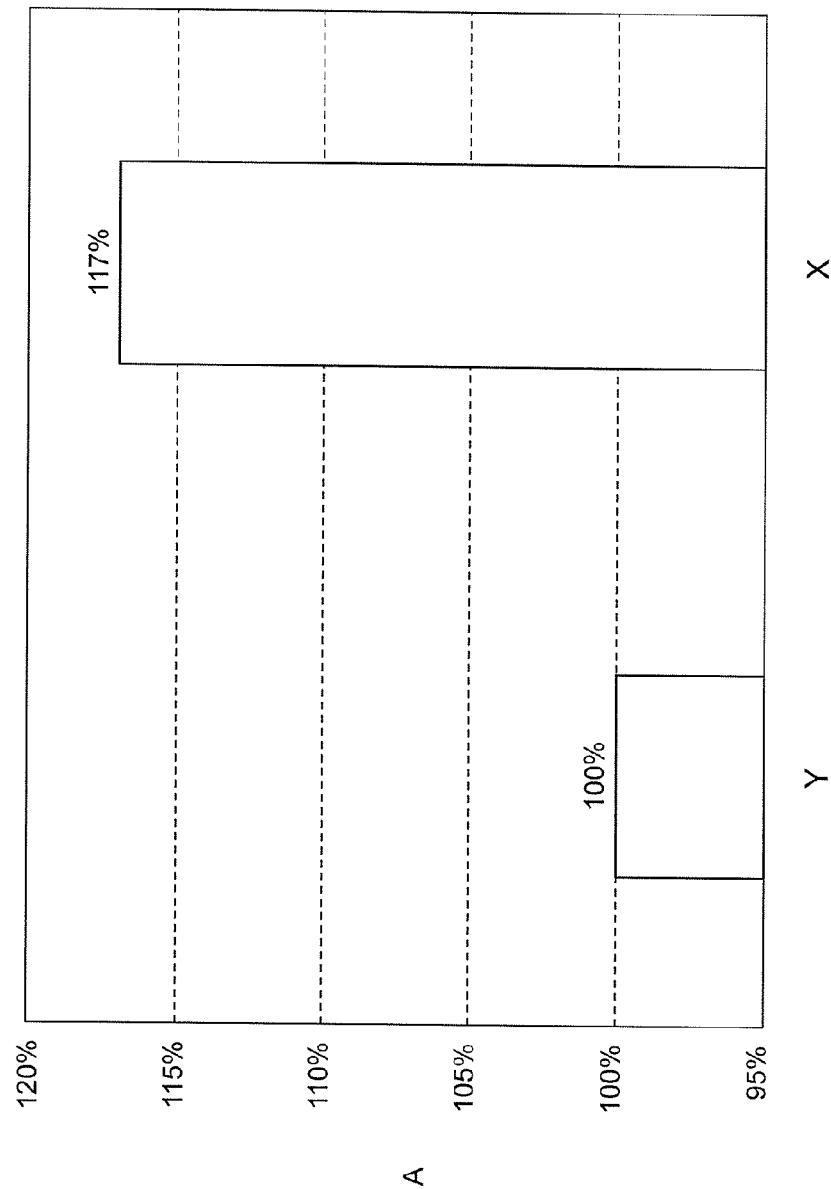
FIG. 9 is a graph showing performance X according to the first embodiment and performance Y according to the comparative example.

Further, a relationship between Lb/La, Ld/Lc and a motor demagnetization current is described. FIG. 7 is a graph showing a relationship between Lb/La and a motor demagnetization current A under the condition of $Ld/Lc=2$. FIG. 8 is a graph showing a relationship between Ld/Lc and the motor demagnetization current A under the condition of $Lb/La=3$. FIG. 9 is a graph showing performance X according to the first embodiment and performance Y according to the comparative example. A vertical axis of FIGS. 7 to 9 represents a current required for demagnetizing a motor by 1%, with the current required for demagnetizing the motor according to the comparative example by 1% being represented as 100%. That is, when the motor is demagnetized, the performance of the compressor and the performance of the refrigerating air-conditioning apparatus vary, and a voltage generated in the motor also changes to degrade the controllability of the motor. Therefore, in order to satisfy the reliability of a product, it is necessary to suppress a demagnetization ratio to a decrease by about 1%. As a demagnetization index, a current value is used, which is determined by using permanent magnets having the same magnetic coercive force for the motor according to the first embodiment and the motor according to the comparative example at 150° C. assuming the inside of the compressor, applying a demagnetization current to the permanent magnet (applying a demagnetization field to the permanent magnet), and obtaining a current value at which an inductive voltage (voltage generated in a winding when the motor is rotated with an external power) decreases by 1%.

As shown in FIG. 7, the 1% demagnetization current increases compared to that of the motor of the comparative example because of the condition of Ld/La=2. On the other hand, an increase ratio is low at Lb/La=1 and increases along with an increase in Lb/La to be saturated at Lb/La≥2. This means the following: even if the permanent magnet embedded electric motor is designed so that the demagnetization flux is easily short-circuited through the Lc, when the Lb is small, the magnet in the vicinity of the slit is demagnetized, with the result that the significant short circuit effect in the Lc cannot be obtained. It is preferred that the Lb be designed to be wide so as to collect the demagnetization flux into the Lc portion, and Lb/La≥2 be satisfied.

Further, as shown in FIG. 8, the 1% demagnetization current increases compared to that of the motor of the comparative example because of the condition of Lb/La=3. On the other hand, an increase ratio is low at Ld/Lc=1, and there is substantially no effect at Ld/Lc<1.2. This means the following: even if the Lb is widened so as to make it difficult for the magnet in the vicinity of the slit to be demagnetized, when the Lc is small, the demagnetization flux causes the magnet to be short-circuited, with the result that the significant effect of suppressing demagnetization is not obtained. In order to release the demagnetization flux through the Lc portion to the interpolar core portion, it is preferred that Ld/Lc≥1.2 be satisfied.

In the first embodiment in which the above-mentioned relationship between the La and the Lb is combined with the above-mentioned relationship between the Lc and the Ld, in view of the foregoing, it is understood that the 1% demagnetization current increases by 17% compared to that of the motor of the comparative example as shown in FIG. 9.

Further, in order to suppress an armature reaction flux from the stator 3, which may cause noise and vibration, the plurality of slits 25 extending further in the magnet thickness direction T than in the magnet width direction W are formed in the rotor core 11. However, simultaneously, the demagnetization flux passes through the rotor core 11 as described above. Such a demagnetization flux is designed so as to pass through a portion between the slit 25 and the magnet insertion hole 21 and to pass through the extended portion 11b in the rotor core 11. Thus, in the first embodiment, in order to prevent the slits 25 for suppressing the armature reaction flux from inhibiting the passage of the demagnetization flux, the slits 25 are formed so as not to be positioned in the region between the virtual line L1 defining the interval S of the flux barriers 23 and the tip end 11b' of the corresponding extended portion 11b.

In the first embodiment configured as described above, the effect of suppressing demagnetization can be significantly enhanced, and in the case where the permanent magnet embedded electric motor is used in the same current range as that of related-art products, a magnet having a lower magnetic coercive force can be used. Specifically, the addition amount of rare-earths for increasing the magnetic coercive force can be reduced, and a low-cost motor can be configured by using an inexpensive rare-earth magnet containing heavy rare-earth elements added thereto in a small amount.

Further, a high-efficiency motor is obtained in which a leakage flux is reduced by providing the flux barrier. Further, due to the slit on the surface of the magnet, the harmonic wave component of a flux density waveform is reduced, and thus the harmonic wave of an inductive voltage and a cogging torque are reduced. In addition, the rotor can be structured so that an armature reaction flux from the stator is less liable to be interlinked with the rotor, and sound vibration can be suppressed. Further, the motor is strong to demagnetization, and hence the thickness of the magnet can be reduced under the same demagnetization resistance as that of the related-art. This also suppresses the usage amount of an expensive rare-earth magnet and enables an inexpensive electric motor to be configured. Through the usage of the motor according to the first embodiment, a highly reliable compressor and a highly reliable refrigerating air-conditioning apparatus, which achieve high efficiency and low noise and which are less liable to be demagnetized, can be configured in actual implementation. Thus, according to the first embodiment, the demagnetization of the magnet can be suppressed in spite of the presence of the flux barrier and the slit. Further, such an advantage is obtained irrespective of a winding system, the number of slots, and the number of poles.

Further, a rare-earth motor containing Dy in a low mass content is liable to be demagnetized due to a decrease in magnetic coercive force at high temperature. However, in the permanent magnet embedded electric motor according to the first embodiment, a magnet containing Dy within a mass content of 2% can also be used without causing demagnetization. When the addition amount of the heavy rare-earth element is reduced, that is, when the mass content of Dy is reduced, the residual flux density of the magnet increases. Therefore, a magnet torque is enhanced, and a current for generating the same torque can be reduced, with the result that a copper loss and a conduction loss of an inverter can be reduced.

Further, the rare-earth magnet has the property of being liable to be demagnetized due to a decrease in magnetic coercive force at high temperature. Therefore, in the permanent magnet embedded electric motor according to the first embodiment, an electric motor having higher demagnetization reliability at high temperature, compared to that of the related-art electric motor, can be configured. In general, R410a refrigerant has been used in a compressor of a refrigerator. However, in the case where R32 refrigerant having a small global warming potential and good efficiency is applied to the compressor, the discharge temperature of the compressor becomes high, and hence it is difficult to ensure demagnetization reliability. When the motor according to the first embodiment is used, the demagnetization characteristics in a high-temperature operation which is caused by the change of a refrigerant for the compressor can be ensured, and the use range as the compressor and the air-conditioning apparatus is enlarged, which can contribute to the improvement of performance.

Second Embodiment

Figure 10:
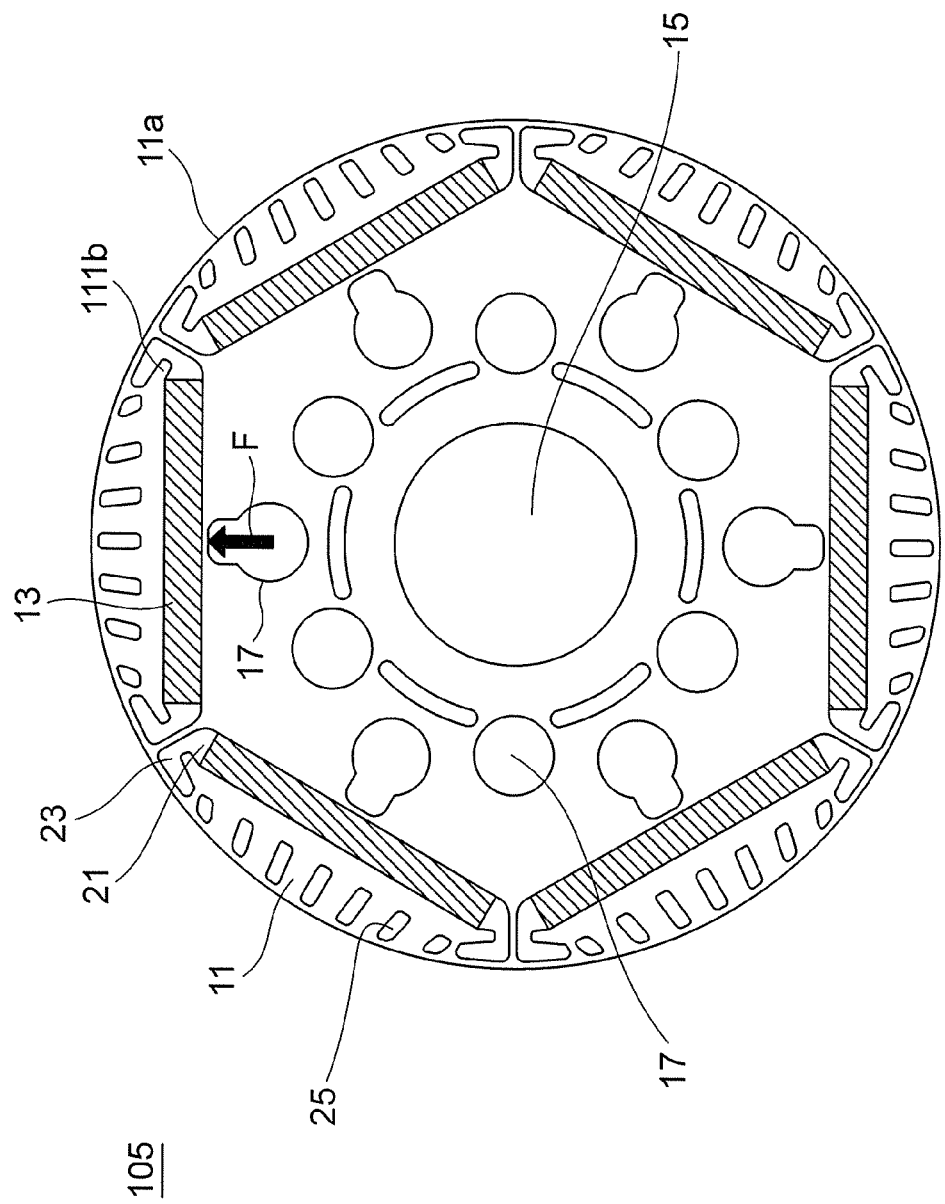
FIG. 10 is a view illustrating a second embodiment of the present invention in the same manner as that of FIG. 2.
Figure 11:
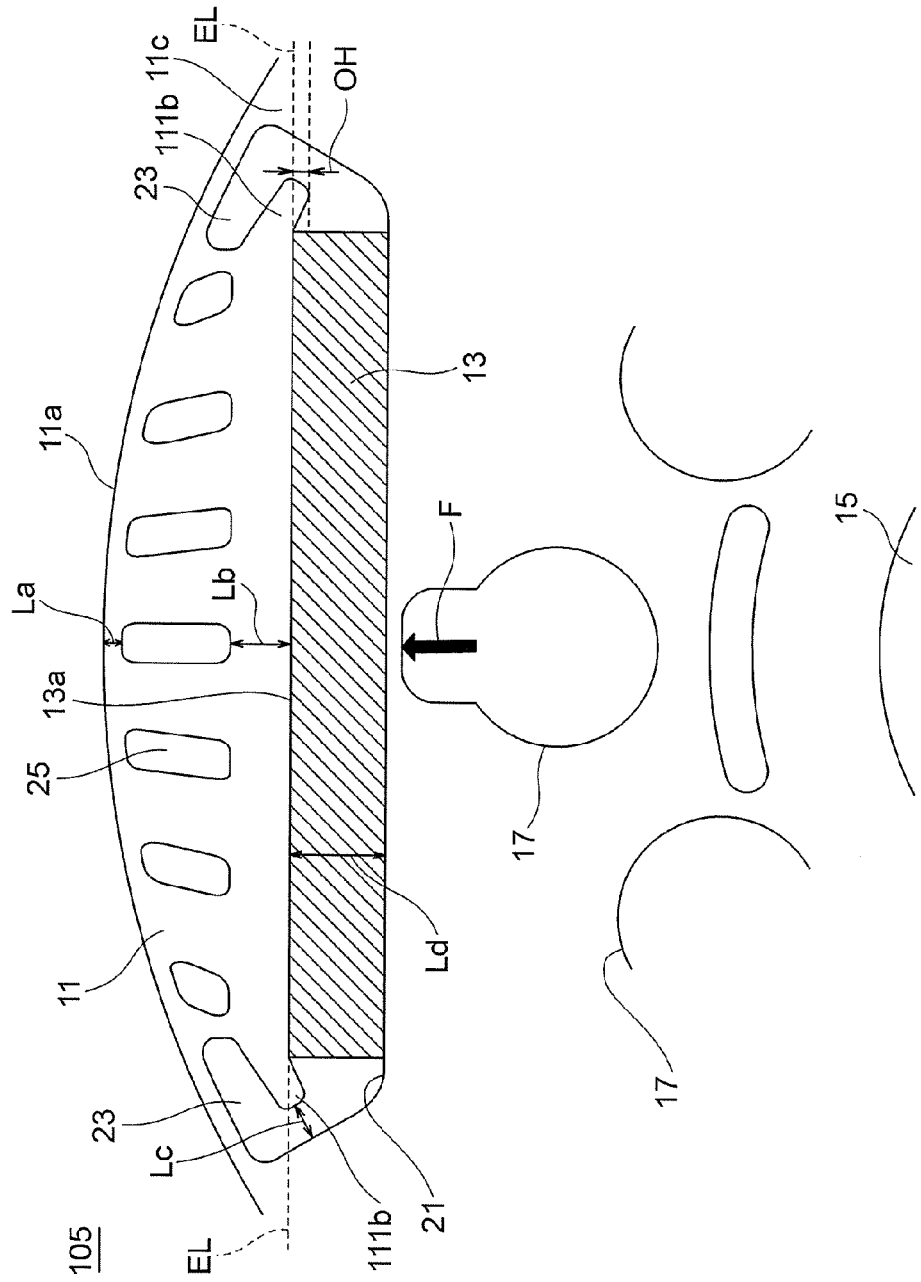
FIG. 11 is a view illustrating the second embodiment in the same manner as that of FIG. 3.

A permanent magnet embedded electric motor according to a second embodiment of the present invention is described. FIGS. 10 and 11 are views illustrating the second embodiment of the present invention in the same manner as those of FIGS. 3 and 4, respectively. Note that, the second embodiment has the same configuration as that of the first embodiment except for portions described below.

Also in a rotor 105 of the permanent magnet embedded electric motor according to the second embodiment, in the hole defining portion of the magnet insertion hole 21, an extended portion 111b is included in an area positioned further on the outer side of the circumferential direction with respect to the width-direction end surface 13b of each permanent magnet 13. The extended portion 111b projects toward the interpolar core portion 11c in the rotor core 11.

The extended portion 111b in the second embodiment is formed so as to gently project toward an inner diameter side with respect to a virtual extended line EL in the width direction of the outer peripheral-side surface 13a of the permanent magnet 13, that is, the extended portion 111b is formed so as to project in such a manner that the extended portion 111b is not excessively brought close to the width-direction end surface 13b of the permanent magnet 13.

In this case, it is important that the projecting extended portion 111b "gently" projects toward the inner diameter side with respect to the outer peripheral-side surface 13a of the permanent magnet 13. When a large portion of the rotor core 11 overlaps the width-direction end surface 13b of the permanent magnet 13, the demagnetization flux is interlinked with the width-direction end surface 13b so as to be demagnetized. In this case, the following is intended. The extended portion 111b projects toward the inner diameter side to such a degree as to position the permanent magnet 13 at the center of the magnetic pole instead of completely fixing the permanent magnet 13. After the permanent magnet 13 is inserted and positioned in the magnet insertion hole 21, a tapered bar is inserted into the air opening 17 formed on the inner diameter side with respect to the magnet insertion hole 21 and press-fits the permanent magnet 13 while deforming the air opening. Accordingly, even when an electromagnetic force is applied to the permanent magnet during driving, the permanent magnet 13 does not move. Alternatively, the permanent magnet 13 may be fixed with an adhesive or the like. It is preferred that an overlapping amount OH between the width-direction end surface 13b of the permanent magnet 13 and the extended portion 111b (overlapping region when viewed in a projected manner from a direction orthogonal to the radial direction (direction in which the outer peripheral-side surface 13a extends) on the drawing sheet of FIG. 11) be set to about 15% or less of the magnet thickness Ld.

Also in the second embodiment configured as described above, the demagnetization of the magnet can be suppressed in spite of the presence of the flux barrier and the slit in the same way as in the first embodiment.

In addition, in the second embodiment, the following advantage is also obtained. Specifically, as in the comparative example illustrated in FIGS. 5 and 6, in the case where a magnet fixing protrusion 211b is formed on the magnet inner diameter side of the magnet insertion hole in order to position the permanent magnet in the magnet insertion hole, a distance between the surface of the magnet on the outer diameter side and the magnet fixing protrusion 211b becomes smaller than the magnet thickness, and the demagnetization flux, which has bypassed the flux barrier having a large magnetic resistance, is concentrated on the magnet fixing protrusion 211b having a small magnetic resistance, with the result that the end portion of the magnet adjacent to the magnet fixing protrusion 211b is liable to be demagnetized.

In contrast, in the second embodiment, the extended portion 111b is gently projected toward the inner diameter side with respect to the virtual extended line EL. Therefore, the position of the permanent magnet 13 in the magnet insertion hole 21 can be fixed, and the distortion of a flux density distribution caused by a magnet phase variation is reduced to suppress vibration noise. Further, the demagnetization flux is guided so as to flow through the Lc, and hence the degradation in demagnetization characteristics of the end portion of the magnet involved in the fixing of the magnet can also be suppressed.

Hereinbefore, the contents of the present invention are specifically described with reference to the preferred embodiments. However, it is apparent to those skilled in the art that various modifications may be made based on the basic technical idea and the teachings of the present invention.

REFERENCE SIGNS LIST 1 permanent magnet embedded electric motor, 3 stator, 5, 105 rotor, 11 rotor core, 11b, 111b extended portion, 11c interpolar core portion, 13 permanent magnet, 13a outer peripheral-side surface, 13b width-direction end surface, 21 magnet insertion hole, 23 flux barrier, 25 slit

The invention claimed is:

1. A permanent magnet embedded electric motor, comprising:
a stator; and
a rotor arranged rotatably so as to face the stator,
wherein the rotor has a rotor core containing a plurality of magnet insertion holes,
wherein a corresponding permanent magnet is inserted in each of the plurality of magnet insertion holes,
wherein each of the magnetic insertion holes has a cross-section matching that of the corresponding permanent magnet contained therein and an area of the rotor core surrounding each of the magnetic insertion holes includes a pair of extended portions extending outwardly from above both ends of the corresponding permanent magnet contained therein,
wherein flux barriers are provided on both sides of each of the magnet insertion holes and extend in a circumferential direction of the rotor core and the circumferential direction has a radius greater than the plurality of magnet insertion holes,
wherein a plurality of slits are formed between each of the magnet insertion holes in the rotor core and a core outer peripheral surface of the rotor core,
wherein the plurality of slits are arranged in the circumferential direction of the rotor core,
wherein each of the plurality of slits extends further in a thickness direction of the corresponding permanent magnet than in a width direction of the corresponding permanent magnet,
wherein the slits are arranged between the corresponding pair of the flux barriers,
wherein an interval between the flux barriers on both sides of each magnet insertion hole is smaller than a width of the permanent magnet,
wherein each of the extended portions projects toward an interpolar core portion in the rotor core in an area positioned on a radial outer side of a width-direction end surface of the corresponding permanent magnet,
an interval in the width direction of the corresponding permanent magnet between tip ends of the pair of the extended wall portions is larger than the width of the permanent magnet, and wherein Lb is larger than La, and Lc is smaller than Ld, where La represents a distance between the plurality of slits and the core outer peripheral surface; Lb represents a distance between the plurality of slits and an outer peripheral-side surface of the permanent magnet; Le represents a shortest distance between the extended portion and the interpolar core portion; and Ld represents a thickness of the permanent magnet.

2. A permanent magnet embedded electric motor according to claim 1, wherein Lb/La≥2 and Ld/Lc≥1.2 are satisfied.

3. A permanent magnet embedded electric motor according to claim 1, wherein the extended portion projects closer to a center of the rotor core with respect to a virtual extended line EL in a width direction of the outer peripheral-side surface of the permanent magnet.

4. A permanent magnet embedded electric motor according to claim 1, wherein the permanent magnet comprises a rare-earth magnet containing Dy in a mass content within 2%.

5. A refrigerating air-conditioning apparatus, comprising a compressor comprising the permanent magnet embedded electric motor of claim 1 as a drive source.

6. A refrigerating air-conditioning apparatus, comprising a compressor comprising the permanent magnet embedded electric motor of claim 1 as a drive source, the compressor using R32 as a refrigerant.

7. A permanent magnet embedded electric motor, comprising:
a stator; and
a rotor arranged rotatably to face the stator, wherein
the rotor includes a rotor core and a core outer peripheral surface surrounding the rotor core and facing the stator,
the rotor core has a disk shape and a plurality of magnet insertion holes,
a corresponding permanent magnet is inserted in each magnetic insertion hole of the plurality of magnet insertion holes, the corresponding permanent magnet having a magnet thickness extending in a magnet thickness direction which is parallel to a diameter of the rotor core and a magnet width extending in a magnet width direction which is perpendicular to the magnet thickness direction,
a pair of flux barriers extending circumferentially within the rotor core from sides of each magnetic insertion hole of the plurality of magnetic insertion holes, an interval between the pair of flux barriers of each magnet insertion hole of the plurality of magnetic insertion holes is smaller than the magnet width of the corresponding permanent magnet,
a plurality of slits arranged in a circumferential direction of the rotor core between the pair of flux barriers of each magnetic insertion hole of the plurality of magnetic insertion holes, the plurality of slits located between the core outer peripheral surface surrounding the rotor core and each magnetic insertion hole of the plurality of magnet insertion holes, each slit of the plurality of slits having a length in the magnet thickness direction longer than a width in the magnet width direction,
an area of the rotor core surrounding each of the magnet insertion holes of the plurality of magnetic insertion holes includes a pair of extended portions projecting outwardly from opposing width end surfaces adjacent the corresponding permanent magnet respectively to an interpolar core portion of the rotor core, the interpolar core portion of the rotor core being located within the core outer peripheral surface of the rotor and outside of a circumference formed by connecting the width end surfaces of the pair of extended portions of the corresponding permanent magnet in each magnetic insertion hole of the plurality of magnetic insertion holes, and an interval in the magnet width direction of the corresponding permanent magnet between tip ends of the pair of the extended portions is larger than the magnet width of the permanent magnet, and
Lb is larger than La, and Lc is smaller than Ld, where La represents a distance between the plurality of slits and the core outer peripheral surface; Lb represents a distance between the plurality of slits and an outer peripheral-side surface of the permanent magnet; Lc represents a shortest distance between the extended portion and the interpolar core portion; and Ld represents a thickness of the permanent magnet.

8. A permanent magnet embedded electric motor according to claim 7, wherein Lb/La≥2 and Ld/Lc≥1.2 are satisfied.

9. A permanent magnet embedded electric motor according to claim 7, wherein the extended portion projects closer to a center of the rotor core with respect to a virtual extended line EL in a width direction of the outer peripheral-side surface of the permanent magnet.

10. A permanent magnet embedded electric motor according to claim 7, wherein the permanent magnet comprises a rare-earth magnet containing Dy in a mass content within 2%.

11. A refrigerating air-conditioning apparatus, comprising a compressor comprising the permanent magnet embedded electric motor of claim 7 as a drive source.

12. A refrigerating air-conditioning apparatus, comprising a compressor comprising the permanent magnet embedded electric motor of claim 7 as a drive source, the compressor using R32 as a refrigerant.

* * * * *